United States Patent
Menke et al.

(10) Patent No.: US 9,457,959 B2
(45) Date of Patent: Oct. 4, 2016

(54) END DRIVE FOR A CONVEYOR, AND CONVEYOR PROVIDED WITH AN END DRIVE

(71) Applicant: REXNORD FLATTOP EUROPE B.V., 's-Gravenzande (NL)

(72) Inventors: Cornelis Hendrik Mijndert Menke, 's-Gravenzande (NL); Leonardus Adrianus Catharinus Cornelissen, 's-Gravenzande (NL)

(73) Assignee: REXNORD FLATTOP EUROPE B.V., 'S-Gravenzande (NL)

( * ) Notice: Subject to any disclaimer, the term of this patent is extended or adjusted under 35 U.S.C. 154(b) by 0 days.

(21) Appl. No.: 14/438,969

(22) PCT Filed: Oct. 29, 2013

(86) PCT No.: PCT/NL2013/050766
§ 371 (c)(1),
(2) Date: Apr. 28, 2015

(87) PCT Pub. No.: WO2014/070000
PCT Pub. Date: May 8, 2014

(65) Prior Publication Data
US 2015/0291362 A1    Oct. 15, 2015

(30) Foreign Application Priority Data
Oct. 29, 2012 (NL) ...................................... 2009722

(51) Int. Cl.
*B65G 21/20* (2006.01)
*B65G 17/08* (2006.01)
*B65G 23/06* (2006.01)

(52) U.S. Cl.
CPC ............... *B65G 21/20* (2013.01); *B65G 17/08* (2013.01); *B65G 23/06* (2013.01)

(58) Field of Classification Search
None
See application file for complete search history.

(56) References Cited

U.S. PATENT DOCUMENTS

| | | | | |
|---|---|---|---|---|
| 3,854,570 A | * | 12/1974 | Kornylak | ............... B65G 17/48 198/800 |
| 4,492,304 A | * | 1/1985 | Geis | ...................... B65G 21/20 198/837 |
| 5,641,057 A | | 6/1997 | Chorlton | |
| 2009/0020397 A1 | | 1/2009 | Hosch et al. | |

FOREIGN PATENT DOCUMENTS

WO    2011067737 A1    6/2011

OTHER PUBLICATIONS

International Search Report and Written Opinion under date of mailing of Feb. 11, 2014 in connection with PCT/NL2013/050766.

* cited by examiner

*Primary Examiner* — Kavel Singh
(74) *Attorney, Agent, or Firm* — Quarles & Brady LLP

(57) ABSTRACT

End drive for a conveyor, comprising a conveying track (6) for, during use, guiding a conveying part of a straight-running modular conveyor mat (2), a return guide (10) extending at a distance along the conveying part for return guidance of a return part of the conveyor mat, and a gear drive (16) located between the conveying track and the return guide for, through engagement of the conveyor mat, drivingly having the conveyor mat round from the conveying track to the return guide. The return guide comprises a guiding envelope (E), linking up with the gear drive and extending along successive rows of modules, in which movement of the return part of the conveyor mat both sideways in the plane of the conveyor mat and transversely to the conveying plane is limited.

9 Claims, 2 Drawing Sheets

END DRIVE FOR A CONVEYOR, AND CONVEYOR PROVIDED WITH AN END DRIVE

CROSS-REFERENCE TO RELATED APPLICATIONS

This application represents the national stage entry of PCT International Application No. PCT/NL2013/050766 filed Oct. 29, 2013, which claims the benefit of Netherlands Patent Application No. 2009722 filed Oct. 29, 2012, the disclosures of which are hereby incorporated by reference in their entirety for all purposes.

The invention relates generally to conveyors, in particular to a conveyor with a conveying track which cooperates with a modular conveyor mat.

Conveyors with modular conveyor mats are generally known and are utilized for industrial conveyance, for instance conveyance of packagings through a production location. Such conveyors typically comprise a track with a conveyor mat which circulates between return elements located at the beginning and end of the conveyor. The conveyor mat is built up from rows of modules successive in the direction of movement, which are hingedly connected to each other. To that end, at their front sides and their rear sides, the modules have a series of coupling ends extending forward and rearward, respectively, which are spaced apart at mutual interspaces transversely to the direction of movement. The coupling ends of successive modules cooperate: in adjacent modules, coupling ends reach into interspaces, for instance like the interdigitating fingers of folded hands. The modules of successive rows are coupled with the aid of hinge pins which reach transversely to the direction of movement through hinge holes, which are provided in the cooperating coupling ends. In a so called straight-running conveyor mat the pitch between successive modules is chosen to be fixed. The hingeable coupling of the successive modules makes it possible for the conveyor mat to round a bend transversely to its plane, and hence to circulate in an endless path around the return elements.

The return elements can be stationary, for instance a stationary tube whose outer surface forms a return surface, but can also be rotary. The return elements can engage the mat, as, for instance, a gear wheel, but can also be non-engaging, for instance a smooth return wheel. For the purpose of guiding the conveyor mat, the return elements are often designed as a set of rotatable gear wheels spaced apart at mutual interspaces transversely to the direction of movement, whose teeth engage the conveyor mat.

The drive of the conveyor mat is often taken care of by an end drive arranged at the end of the conveyor. The end drive comprises a gear drive, which is typically configured as a driven shaft having thereon a set of rotatable gear wheels spaced apart at mutual interspaces transversely to the direction of movement, whose teeth engage the conveyor mat.

To compensate for lengthwise expansion of the conveyor mat and to regulate the cooperation of the driven gear with the conveyor mat, in the known conveyors, in the end drive, in the first part of the conveyor mat's return part running back straight between the return elements, after the driven return elements, a catenary sag section is realized, in which the conveyor mat sags freely.

Especially in straight-running conveyor mats having a great length, for example, a length of a few tens of meters, the lengthwise expansion can be significant, and a large catenary sag section may be necessary. Especially in the case of so called people movers, where the conveyor mat can have a length of more than 50 or 100 m, and in pasteurizers, where the conveyor mat can have a length of more than 20 m and where the conveyor mat is heated up tens of degrees Celsius along the conveying path, the length expansion may be very great, also because of the relatively large tensile forces in this type of conveyor mats.

The catenary sag section, however, occupies space, which is rather avoided from a viewpoint of compactness and cost-effectiveness. Also, in practice, regularly situations occur where such space is not available. Thus, in the case of a people mover, a relatively deep pit needs to be dug in the floor under the conveyor to accommodate the sag section, and in the case of a pasteurizer it is difficult, because of the sag section, to have several conveyors running above each other in decks in a low overall height.

The object of the invention is to provide a conveyor for cooperation with a straight-running conveyor mat with an end drive, whereby the length expansion can be compensated without catenary sag section.

To that end, the invention provides an end drive for a conveyor, comprising a conveying track for, during use, guiding a modular conveyor mat of the straight-running type, a return guide extending at a distance along the conveying part for return guidance of a return part of the conveyor mat, and a gear drive located between the conveying track and the return guide for, through engagement of the conveyor mat, drivingly having the conveyor mat round from the conveying track to the return guide, wherein the conveying track and the return guide are of straight design, wherein the gear drive drives the conveyor mat over the width thereof, and wherein the return guide comprises a guiding envelope, linking up with the gear drive and extending along successive rows of modules, in which movement of the return part of the conveyor mat both sideways in the plane of the conveyor mat and transversely to the conveying plane is limited.

By providing a guiding envelope in the return guide in which the conveyor mat is retained transversely to the plane of the conveyor mat, the straight sag section in the return part can be obviated. In particular, what can be counteracted in this manner, is that the mat leaves the gear wheel too soon and the gear wheel slips clear of the mat, and that the mat moves along with the gear wheel for too long and the mat doubles.

Advantageously, the guiding envelope comprises a compression zone in which successive modules of the conveyor mat, during use, both in an area corresponding to the inner side of the bend and in the area on the outer side of the bend, can be slid into each other in a compression zone without the mat buckling. Successive modules of the mat can thus be pressed into each other over the entire width of the mat to compensate for lengthwise expansion of the conveyor mat. In the guiding envelope, the successive modules are held in a flat plane, so that they can be passed through the guiding envelope with low friction and wear. In the compression zone the pitch between successive modules is smaller than the pitch between successive modules in the tensile-loaded portion of the top part. In the compression zone the pitch between successive modules is less than the nominal pitch of the modules of the conveyor mat.

Through clearance between the hinge pins and the hinge holes, the coupling ends of the modules of the straight-running mat—despite their not being specifically designed for this—can locally slide deeper into the interspaces. Preferably, however, the hinge holes of the forward and/or rearward reaching coupling ends are oversized with respect to the hinge pins, so that successive modules of the straight-running mat can slide into each other, as in a side-flexing mat, but then not only in the inside bend, but throughout the width of the conveyor mat. The hinge holes may be oversized in that, for instance, they have a circular cross section of a diameter that is a few millimeters greater than the diameter of the hinge pins, but the hinge holes of the forward and/or rearward reaching coupling ends may also be designed with slotted holes extending in the conveying direction.

The length increase of the whole conveyor mat can thus be compensated in the area after the gear drive by the modules sliding into each other. Through use of the envelope, the mat can then be pushed to return without buckling. Thus, the conveyor can be free of a sag section without the occurrence, at the tops and valleys of the buckling mat, of locally increased surface pressure, increased friction or concentrated wear.

The guiding envelope involves a first, straight-running zone of the return guide, in which sideways movement of the conveyor mat in the plane of the conveyor mat and upward and downward movement transverse to the conveying surface is limited. Owing to the construction of the conveyor mat from relatively rigid modules and hinge pins, there is no need to physically arrange a continuous guide surrounding the conveyor mat throughout the zone. In the direction of movement the unsupported length is less than the pitch of the module, for instance half the pitch or less, but transversely to the direction of movement the unsupported length can be greater than the dimension of a module. Transversely to the plane of the conveyor mat, the movement is limited to a clearance of less than half the pitch of the module, but preferably to less than 5 mm, for example, about 1-3 mm. The longitudinal edges of the conveyor mat are preferably received with a clearance of a few millimeters in continuous, U-shaped guiding channels, which run straight in the direction of movement of the mat. Alternatively or additionally, furthermore, sideways movement of the conveyor mat in its plane can be counteracted by straight return guide strips which cooperate by their side faces with side faces of guiding elements which reach outwards relative to the bottom surface of the modules, which faces up in the return guide.

The top and bottom surface of the mat are preferably supported by guides spaced apart at a mutual distance of, for instance, 10-30 cm transversely to the direction of movement, which guides also extend in the direction of movement, between which the mat is received with a few millimeters of clearance. The upper return guide cooperates with the bottom surface of the conveyor mat in the return guide, and extends along the gear wheel to near the '6 o'clock' position of the gear wheel, and counteracts the gear wheel carrying along the conveyor mat. The lower return guide cooperates with the top surface of the conveyor mat in the return guide, and extends in the plane of the gear wheel, to near the '6 o'clock' position, and preferably beyond that upwards along the circumference of the gear wheel.

The invention also relates to a conveyor provided with a modular conveyor mat.

The invention will be further elucidated on the basis of an exemplary embodiment which is represented in a drawing. In the drawing.

It is noted that the figures are merely schematic representations of a preferred embodiment of the invention, which is given here by way of non-limiting exemplary embodiment. In the figures the mat is represented in a schematic outline as relatively narrow and short. In reality, however, the length of the conveyor mat is a few tens of meters, for example, 20-100 m and the width can be a few meters, for example, 2-8 m.

Figure 1:
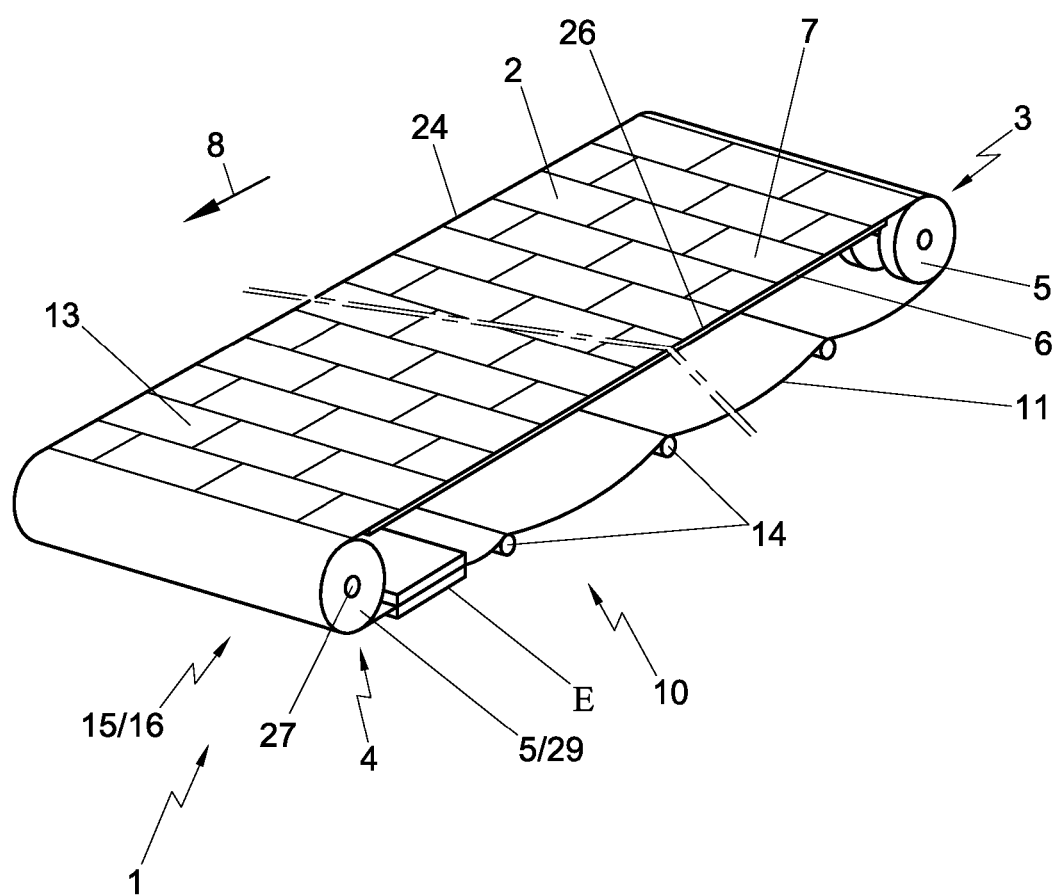
FIG. 1 shows a schematic perspective view of a conveyor with a modular straight-running mat.

FIG. 1 shows a conveyor 1 with a modular conveyor mat 2. The conveyor 2 has a straight-running conveying path. The conveyor mat 2 circulates in an endless loop between return elements 5 located at a beginning 3 and an end 4 of the conveyor 1. The conveyor 1 comprises a conveying track 6 for, during use, keeping flat and guiding a conveying part 7 of the conveyor mat 2. The conveying track 6 forms a substantially horizontal support surface for the conveying part 7 of the conveyor mat. On the conveying part 7, products can be conveyed in a direction of movement of the conveyor mat 2 indicated with an arrow 8. The support surface is built up from a series of wear resistant smooth strips 9 which cooperate with the bottom sides 12 of the modules 13 of the conveyor mat 2.

The conveyor 1 is further provided with a return guide 10 extending at a distance underneath the conveying part 7 for return guidance of a return part 11 of the conveyor mat 2. The return guide 10 comprises a series of guiding tubes 14 extending transversely to the direction of conveyance, spaced apart at mutual interspaces in the direction of movement 8 of the conveyor mat 2. The return guide 10 supports and guides the return part 11 in that the top sides 15 of the modules 13 of the conveyor mat 2 rest on the guiding tubes 14. The conveyor 1 is provided with an end drive 15, located at the end 3, which is shown in detail in FIGS. 2-4.

The end drive 15 comprises a drive unit, not represented, here an electric motor, which drives a gear drive 16 located between the conveying track 6 and the return guide 10. The gear drive comprises a rotatably disposed shaft 30 which bears the return elements 5, which are designed as gear wheels 29 provided with toothed rings 17. The gear wheels 29 drivingly cause conveyor mat 2, through the toothed rings engaging the modules 13, to round from the conveying track 6 to the return guide 10.

The conveyor mat 2 is built up from rows 18 of modules 13 successive in the direction of movement 8. At their front and rear sides 19, 20, the modules 13 comprise coupling ends 22 spaced apart at mutual interspaces 21. The coupling ends 22 reach into the interspaces 21 of adjacent modules 13. The successive modules 13 are coupled with the aid of hinge pins 23 extending transversely to the direction of movement 8. The hinge pins 23 reach through hinge holes 27 provided in the coupling ends. In the direction of movement 8, the nominal pitch of the modules 13 is constant, for instance 2.54 cm (1 inch). In the conveying part the modules 13 are at their nominal pitch, or slightly above that due to wear, tensile force and/or thermal expansion. The hinge holes 27 in the coupling ends 22 reaching forward and rearward in the conveying direction are preferably oversized with respect to the hinge pins reaching through the hinge holes 27. The hinge holes 27 and the hinge pins are, for example, of cylindrical design, with a diameter difference of a few millimeters, for example, 1-5 mm. Alternatively, the coupling ends 22 may be provided with slotted holes.

In this example, transversely to the direction of movement 8, several modules 13 are included next to each other in the rows 18. Also, the modules 13 of successive rows 18 are here staggered relative to each other, as in a brick laying pattern. It is noted that it is also possible to form rows 18 of the mat 2 with only one module 13, and to include the modules 13 in the conveyor mat 2 in a non staggered manner. In this example, the modules 13 are manufactured from plastic material, for instance, PBT, Acetal or Nylon, but other materials are also possible. In this exemplary embodiment, the hinge pins 23 are made of another kind of plastic material, for instance, PBT or PP, but other materials are also possible, such as steel. The specific design of the modules of the modular straight-running mat is not relevant to the subject matter of this application.

Figure 2:
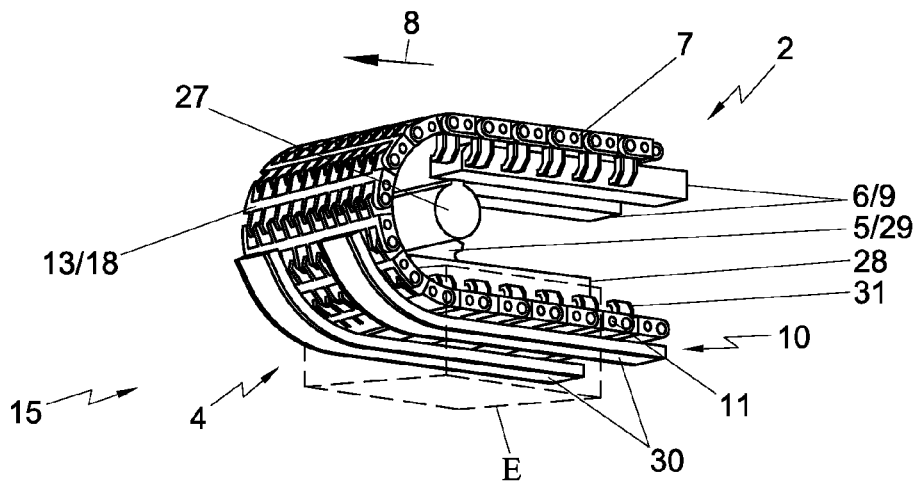
FIG. 2 shows a schematic perspective front view of an end drive of the conveyor of FIG. 1.
Figure 3:
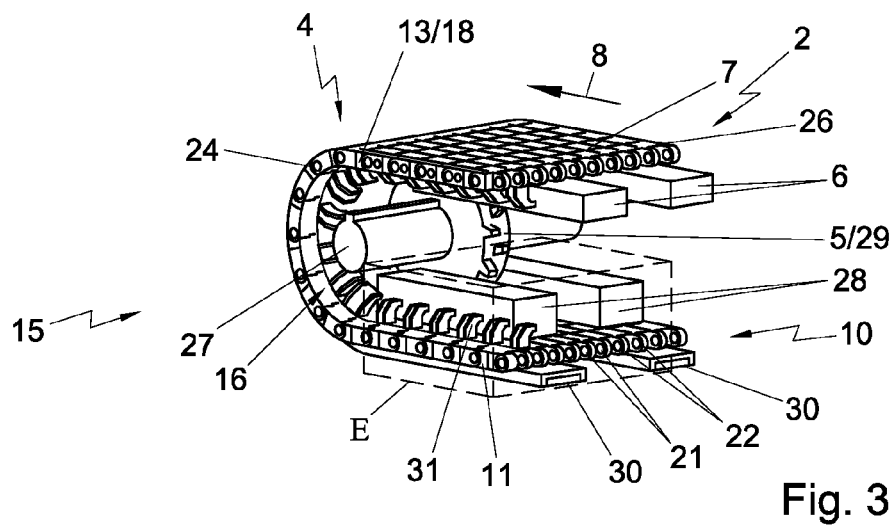
FIG. 3 shows a schematic perspective rear view of the end drive of FIG. 2.
Figure 4:
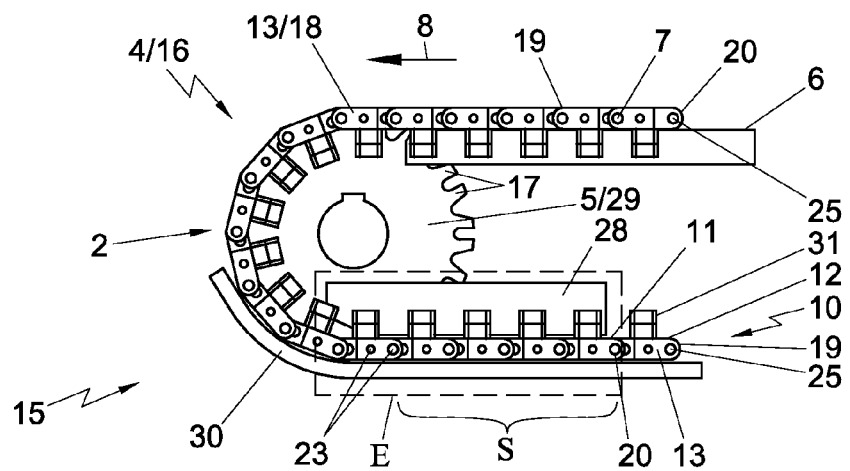
FIG. 4 shows a schematic side view of the end drive of FIG. 2.

Referring to FIGS. 2-4, there is shown an end drive for the conveyor of FIG. 1. The figures show the end drive 15, comprising a conveying track 6 for, during use, guiding a conveying part 7 of a modular conveyor mat 2 of the straight-running type, a return guide 10 extending at a distance along the conveying part 7 for return guidance of a return part 11 of the conveyor mat 2, and a gear drive 16 located between the conveying track 6 and the return guide 10 for, through engagement of the conveyor mat 2, drivingly having the conveyor mat 2 round from the conveying track 6 to the return guide 1.

It can further be seen that the return guide 10 of the end drive 15 comprises a guiding envelope E linking up with the gear drive 16 thereof and extending along successive rows 18 of modules 13. In the guiding envelope E, the movement of the return part 7 of the conveyor mat 2 both sideways in the plane of the conveyor mat 2 and upward and downward transversely to the plane of the conveyor mat 2 is limited. In the guiding envelope, the conveyor mat 2 is only free to move in the conveying direction 8. Throughout the width of the conveyor mat, successive modules 13 of the conveyor mat 2 are slid into each other, without buckling of the mat, in a compression zone S. Here, the length expansion of the mat is compensated, so that no voluminous sag segment is needed.

The guiding envelope E concerns a straight-running zone of the return guide 10, extending from the gear wheel 32, in which the conveyor mat 2 is confined sideways in the plane of the conveyor mat 2 and transversely to the plane of the conveyor mat 2. Transversely to the plane of the conveyor mat 2, the movement is limited to a clearance of a few millimeters. The longitudinal edges 26, 28 of the conveyor mat 2 can be received with a clearance of a few millimeters in continuous U-shaped guiding channels 39, 40, not represented. The bottom surface and the top surface of the conveyor mat 2 are supported by return guides 31, 33 spaced apart at a mutual distance transversely to the direction of movement. The guides 31, 33 also extend in the direction of movement 8.

The upper return guide 31 is here designed as a strip, and cooperates with the bottom surface of the conveyor mat 2, which faces up in the return guide 10. The upper return guide 31 then extends along the gear wheel 32 to near the '6 o'clock' position of the gear wheel. This upper return guide 31 counteracts the gear wheel 32 carrying along the conveyor mat 2 upwards too far. The upper return guide furthermore cooperates through its side surfaces with side surfaces of guiding elements 31 which are arranged in the mat 2, and which reach outwards relative to the bottom side, which faces up in the return part 11. Thus, sideways displacement of the return part in the plane of the conveyor mat can be counteracted. The lower return guide 33 cooperates with the top surface of the conveyor mat 2, which faces down in the return guide 10. The lower return guide 33 is here also of strip-shaped design. The lower return guide extends in the plane of the gear wheel 29 as far as the '6 o'clock' position, and runs from there along the circumference of the gear wheel 29, upwards as far as the '3 o'clock' position.

In this exemplary embodiment, the guiding envelope E is thus formed by the upper guide 31 which counteracts upward movement of the mat's bottom surface, facing up in the return, and which through cooperation with guiding elements 34 counteracts sideways movement, and the lower guide 33 which counteracts downward movement of the top surface of the mat, facing down in the return. The guiding envelope ensures that the mat, as a result of the pushing force exerted on it, can only move in the direction of the track, so that the length increase of the mat can be compensated in that locally the clearance is pressed out of the mat. In traversing the compression zone S in the guiding envelope E the successive modules are held in a flat plane, so that they can be passed through the guiding envelope and the compression zone with little friction and wear. The pitch between successive modules here is less than the nominal pitch of the modules in the mat. The gear wheel 29 of the gear drive 16 comprises a toothed ring 17. Possibly, transversely to the direction of movement 8 of the mat 2, several gear wheels may be spaced apart. The teeth of adjacent toothed rings are then arranged in the same angular positions, and their interspaces along the circumference of the gear wheel 29 correspond to the nominal pitch of the modules 13. The teeth here reach into the interspaces and cooperate by their teeth flanks with end faces of the coupling ends 22. As an alternative, for instance, the teeth may also engage in drive pockets in the undersides of the modules, or engage the hinge pins.

As for the purport of this disclosure, it is pointed out that technical features which have been specifically described may be susceptible of functional generalization. It is further pointed out that—insofar as not explicitly mentioned—such technical features can be considered separately from the context of the given exemplary embodiment, and can further be considered separately from the technical features with which they cooperate in the context of the example.

As for the scope of protection, it is pointed out that the invention is not limited to the exemplary embodiment represented here, and that many variants are possible. For instance, parts of the conveying path can be ascending or descending, and the return can optionally be located above the conveying part. Also, it is possible that the conveying part of the conveyor mat in rounding is guided from the conveying track to the gear drive via one or more guiding rollers, for instance one or more guiding rollers of relatively small diameter extending over the width of the mat, which are disposed, with their rotation axis parallel to the driving shaft of the gear drive, between the gear drive and the conveying track. Such a set-up has as an advantage that the conveyor adjacent the guiding roller can link up with a follow-up conveying apparatus and, owing to the relatively small diameter of the guiding roller, can link up with the follow-up conveying apparatus relatively closely. Such a guiding roller may also be arranged near the beginning of the return guide, to ensure that the conveyor mat runs in a controlled manner over a larger part of the circumference over the gear wheel. Such variants will be clear to the skilled person, and are understood to be within the scope of the invention as set forth in the following claims.

LIST OF REFERENCE NUMERALS

1. Conveyor
2. Conveyor mat

3. Beginning
4. End
5. Return element
6. Conveying track
7. Conveying part
8. Arrow
9. Strips
10. Return guide
11. Return part
12. Bottom side module
13. Module
14. Guiding tubes
15. End drive
16. Gear drive
17. Toothed ring
18. Row
19. Front side
20. Rear side
21. Interspace
22. Coupling end
23. Hinge pin
24. Longitudinal edge
25. Hinge hole
26. Longitudinal edge
27. Shaft
28. Upper return guide
29. Gear wheel
30. Lower return guide
31. Guiding elements
32. Guiding channel
33. Guiding channel
E. Guiding envelope
S. Compression zone

The invention claimed is:

1. An end drive for a conveyor comprising:
    a straight-running modular conveyor mat including modules defining a conveyor pitch, said modules being joined by hinge pins extending through hinge holes formed through said modules, said hinge holes being oversized with respect to said hinge pins;
    a conveying track guiding a conveying part of the straight-running modular conveyor mat;
    a return guide extending at a distance along the conveying part for return guidance of a return part of the conveyor mat;
    a gear drive located between the conveying track and the return guide, said gear drive driving said conveyor mat through said conveying track and return guide over the width of the conveyor mat; and
    a guiding envelope forming part of the return guide and linking up with the gear drive, said guiding envelope extending along successive rows of modules of the conveyor mat, in which movement of the return part of the conveyor mat both sideways in the plane of the conveyor mat and transversely to the conveying plane is limited.

2. An end drive according to claim 1, wherein the guiding envelope comprises a compression zone in which, during use, successive modules of the conveyor mat are slid into each other in a compression zone without buckling of the mat.

3. An end drive according to claim 1, wherein the guiding envelope comprises longitudinally extending, straightened U-shaped guiding channels in which during use longitudinal edges of the conveyor mat are received.

4. An end drive according to claim 1, wherein the guiding envelope comprises upper and lower return guides, spaced apart transversely to the conveying direction, extending in the direction of movement of the conveyor mat, between which during use the conveyor mat is received with a few millimeters of clearance.

5. An end drive according to claim 4, wherein the lower return guides in each case are located in the plane of a return element.

6. An end drive according to claim 4, wherein the upper return guides in each case are located next to a return element.

7. A conveyor comprising:
    a modular straight-running conveyor mat circulating in an endless loop between return elements located at a beginning and an end of the conveyor, said conveyor mat including modules joined by hinge pins extending through hinge holes formed through said modules, said hinge holes being oversized with respect to said hinge pins;
    a conveying track guiding a conveying part of the conveyor mat;
    a return guide extending at a distance underneath the conveying part for return guidance of a return part of the conveyor mat; and
    an end drive according to claim 1 located at the end of the conveyor between the conveying track and the return guide.

8. An end drive according to claim 1, wherein the hinge holes of the straight-running mat are slotted holes extending in a conveying direction.

9. An end drive according to claim 1, wherein the guiding envelope includes upper and lower return guides spaced apart transversely to a conveying direction, extending in the direction of movement of the conveyor mat, between which during use, the conveying mat is received with a clearance of less than half the pitch.

* * * * *